J. L. OWENS.
Harvester.
No. 222,419.     Patented Dec. 9, 1879.
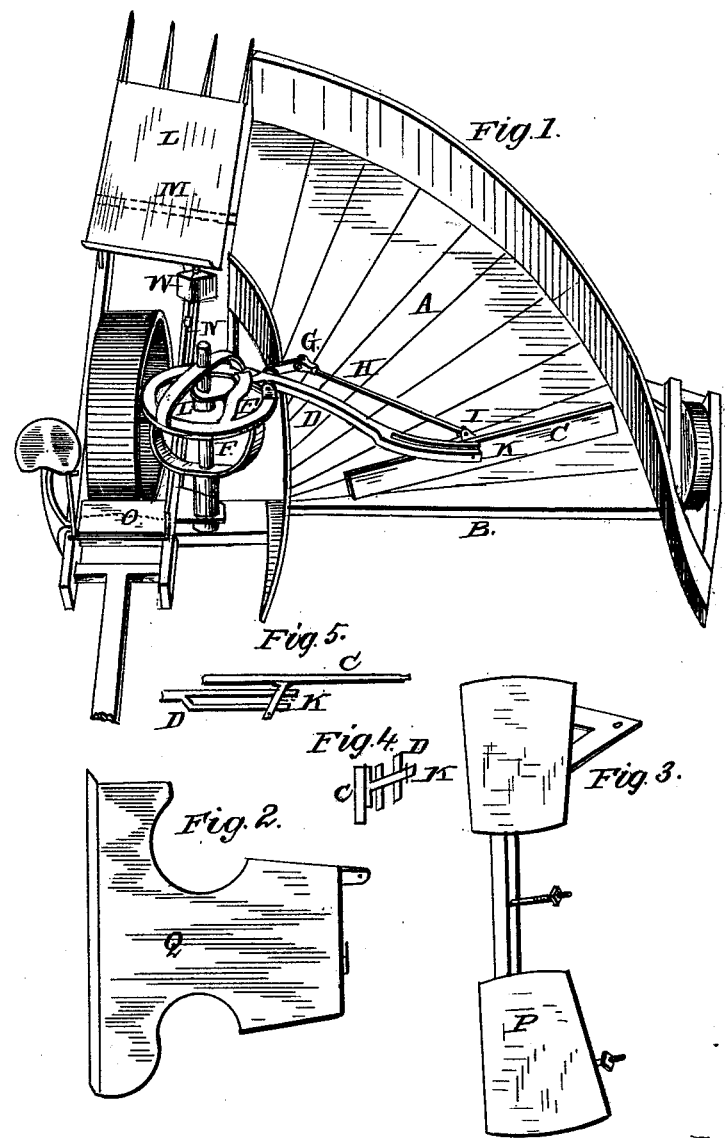

UNITED STATES PATENT OFFICE.

JOHN L. OWENS, OF CAMBRIA, WISCONSIN.

IMPROVEMENT IN HARVESTERS.

Specification forming part of Letters Patent No. 222,419, dated December 9, 1879; application filed December 21, 1877.

*To all whom it may concern:*

Be it known that I, JOHN L. OWENS, of Cambria, in the county of Columbia and State of Wisconsin, have invented a new and useful Improvement in Harvesting-Machines, which improvement is fully set forth in the following specification and accompanying drawings, in which—

Figure 1 is a perspective view of harvester; Fig. 2, a view of binders' table; Fig. 3, a view of binders' platform; and Figs. 4 and 5, sectional views of rake-joint.

The object of my invention is to provide a harvester which shall, by one sweep of a rake, elevate and deliver the grain to the binders, in which the rake shall deliver the grain squarely off the platform, and with which the grain may be bound on the machine or delivered in gavels on the ground; and the invention consists in the combination of parts, as will be hereinafter fully described, and pointed out in the claims.

In the drawings, Fig. 1, A is the platform, which rises as it recedes from the bar B, and curves or angles, so that the grain, as it is carried around by the rake, is also elevated. A post, F, is set on the frame of the machine, about which revolves the rake-carrier E, and to which is attached a cam, L, to raise and lower the rake-arm D. On the carrier E is also a stud, G, to which is hinged a rod, H, connecting it with the rake C by a hinge-stud, I. The rake-arm D is forked at its lower end, and has holes in which the pin K, attached to the rake C, may move. The stud I is placed over the pin K, so that a reciprocating motion of the rod H causes the rake to turn on the pin K.

L is a dropping-table having a bearing at M in front of the middle, and having a weight, W, to hold it when empty in a horizontal position. A cord is attached, passing to the lever O, by which it may be controlled by the driver.

The dropping-table, being removable, may be detached, and the platform P and table Q attached for the use of the binders.

The rake C is attached to the arm D in such a manner that when the rake passes the bar B the rake C is parallel with the bar.

It is desirable that the rake should have other motions than the curving and ascending motions given by the arm D and cam L for use on this platform, since the outer end of the rake must have a relatively-downward motion. This motion is given by the rod H, attached to the rake-stud I above the bearing-pin K, and to the stud G at a distance from the bearing of the rake-arm D, by which, as the rake rises, it is also turned on the pin K.

It is desirable that while the rake strikes the butts of the grain even with the bar B when it enters the platform, it should, when it leaves the platform, have the inner end of the rake in advance, to compensate for the greater velocity of the outer end and deliver the gavel squarely across the table. To accomplish this the pin K is inclined horizontally inward, as shown in Fig. 5, so that the revolving motion given it by the rod H as it passes up the platform will throw the inner end forward; also, the pin K is inclined upward, as shown in Fig. 4, for the purpose, by the same motion, of throwing the bottom of the rake forward, so as to leave the butts of the grain square in every direction.

It operates as follows: The grain being upon the lower front part of the platform, the rake strikes the butts and carries it spirally upward and backward, according to the shape of the platform A, and delivers it upon the binders' table Q, where it is bound; or, the dropping table being attached, the grain falls upon that, a greater part of the weight of the gavel behind the bearing, when the table drops and the grain slides to the ground.

Having thus described my invention, what I claim as new, and desire to secure by Letters Patent, is—

1. The combination, with a platform running spirally upward and backward, of a rake pivoted to the rake-arm upon an axis inclined inwardly and upwardly, substantially as and for the purpose specified.

2. The combination, with a platform running spirally upward and backward, of the rake C, pivoted to the rake-arm upon an axis inclined to the plane of the rake, and the hinged rod H, the several parts constructed and relatively arranged to operate substantially as and for the purpose herein shown and described.

JOHN L. OWENS.

Witnesses:
W. F. SUNDERLAND,
NEIL McFADYEN.